July 9, 1940.   J. W. LEIGHTON   2,207,465
WHEEL SUSPENSION
Filed Feb. 4, 1938   2 Sheets-Sheet 1

INVENTOR
John W. Leighton
BY Harness, Dickey & Pierce
ATTORNEYS.

July 9, 1940.     J. W. LEIGHTON     2,207,465
WHEEL SUSPENSION
Filed Feb. 4, 1938     2 Sheets-Sheet 2
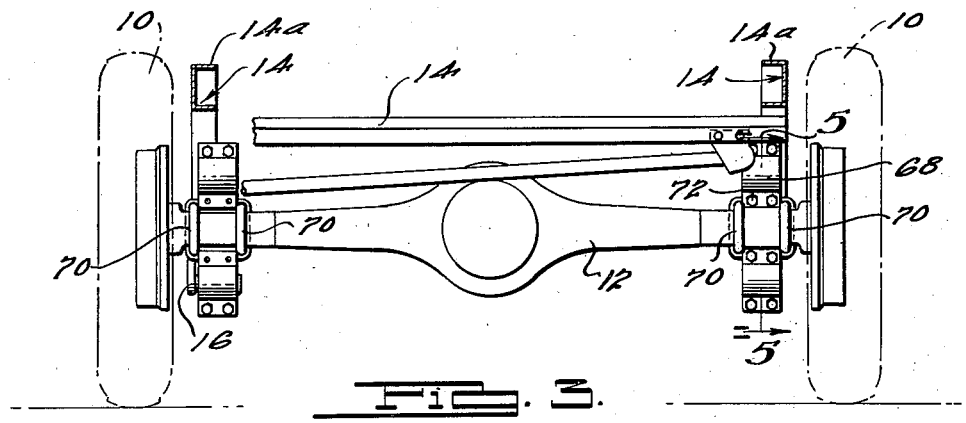
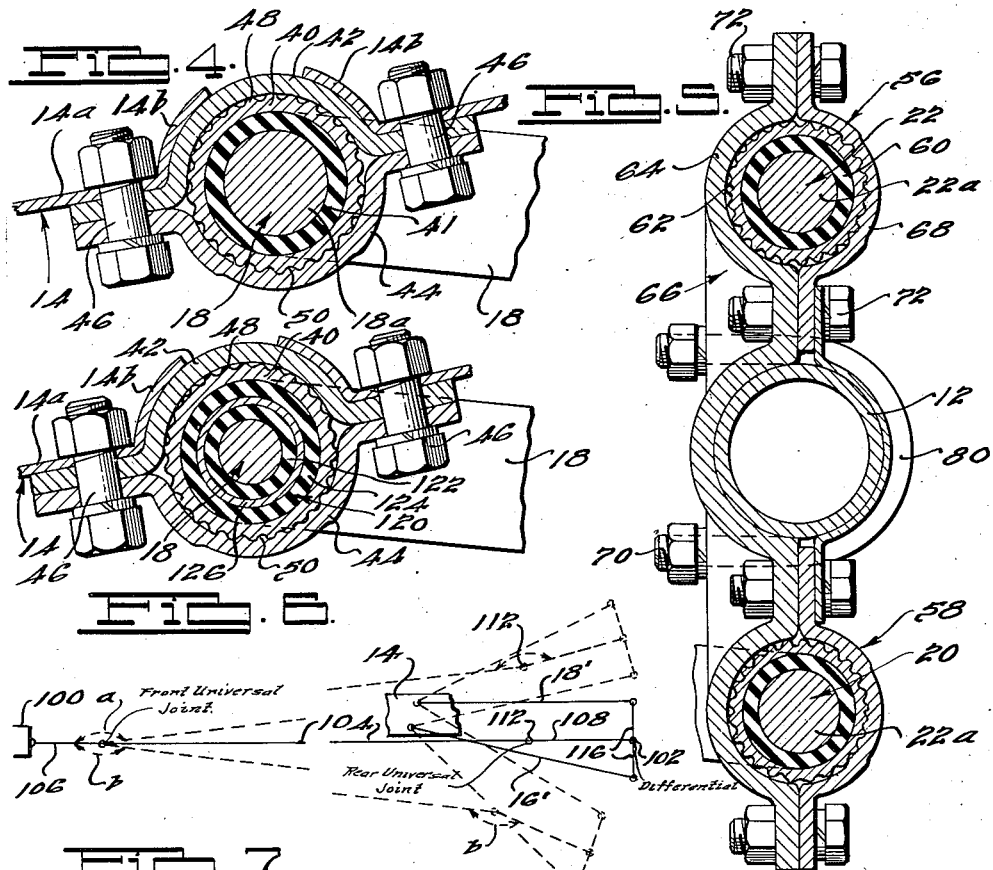
INVENTOR
John W. Leighton.
BY Harness, Dickey & Pierce
ATTORNEYS.

Patented July 9, 1940

2,207,465

UNITED STATES PATENT OFFICE 2,207,465

WHEEL SUSPENSION

John W. Leighton, Port Huron, Mich.

Application February 4, 1938, Serial No. 188,726

7 Claims. (Cl. 267—21)

The present invention relates to motor vehicles, and has particular relation to spring suspension between the frame of the vehicle and the wheels thereof.

The co-pending application Serial No. 184,961, filed January 14, 1938, by the present applicant discloses and claims certain aspects of a wheel suspension for vehicles characterized broadly in that the coil or leaf spring mechanism conventionally used heretofore for connecting the wheel mounting members with the vehicle frame are replaced by spring elements utilizing rubber under a torsional stress. The structure of the co-pending application is specifically directed to wheel suspensions of the individual type for the front wheels of the vehicle. The present invention is an improvement upon the invention disclosed in the co-pending application in that, among other things, it extends the improvements thereof to suspensions for the rear wheels.

With the above as well as other considerations in view, principal objects of the present invention are to provide a suspension for the rear wheels of a vehicle wherein rubber under a torsional stress is employed for resiliently connecting the rear wheels to the frame; to provide such an arrangement employing links pivotally connected at one end to the vehicle frame and at the other end to the rear axle, at least certain of the pivotal connections being formed to include a torsionally stressed rubber element; to provide such a construction characterized in that improved means are provided for enabling adjustment of the stress in the rubber elements; to provide such a structure which is simple and inexpensive to manufacture and which is capable of installation and adjustment; and to provide a suspension characterized as reducing the required angular movements of the universal joints in a drive having universal joints adjacent both ends of the drive shaft, while at the same time producing a true uniform velocity relation at the rear axle.

With the above as well as other objects in view, which appear in the following description and in the appended claims, preferred but illustrative embodiments of the invention are shown in the accompanying drawings, throughout the several views of which corresponding reference characters are used to designate corresponding parts and in which:

Fig. 3 is a view in rear elevation, taken along the line 3—3 of Fig. 1;

Fig. 4 is a fragmentary detail view in vertical section, taken along the line 4—4 of Fig. 1;

Fig. 5 is a detail view in vertical section, taken along the line 5—5 of Fig. 3;

Fig. 6 is a detail view in vertical section of a modification of the invention; and Fig. 7 is a diagrammatic view illustrative of a further feature of the present invention.

Figure 1:
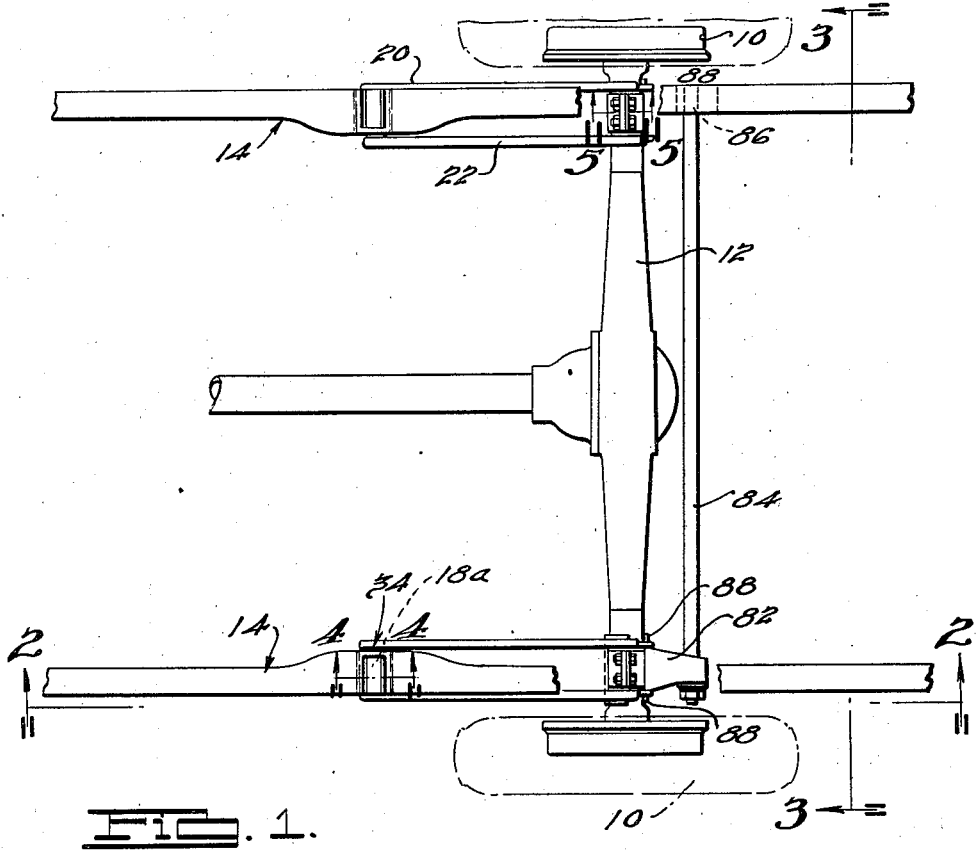
Figure 1 is a view in top plan of the rear end of a vehicle, embodying the improved suspension of the present invention.

Referring to the drawings, the rear wheels 10 of a vehicle which are conventionally supported upon a rear axle, the housing for which is designated 12, are suspended from the frame 14 of the vehicle, through the improved suspension of the present invention. In its illustrated form, the improved invention comprises a pair of links arranged at each side of the vehicle, the forward ends of all of the links being pivotally connected to the frame, and the rear ends of all of the links being pivotally connected to the rear axle housing 12.

The links at one side of the vehicle are designated 16 and 18, respectively, and the links arranged at the opposie side of the vehicle are designated 20 and 22, respectively, the arrangements of the respective sides being identical with the exception of the difference in a bracket construction which is described below.

In the embodiment now being described, the links 16 and 18 are arranged substantially as a parallel link system, the link 18 being positioned somewhat above the link 16. Both links 16 and 18 have their ends turned at right angles to the main body portion thereof, to form trunnion portions for association with the "spring joints" therefor. The lower link 16 is positioned on the outer side of the frame portion and the trunnion portions thereof extend inwardly through their associated bearings 30 and 32. The upper link 18 is oppositely positioned, adjacent the inner face of the frame 14, and the trunnion portions thereof project outwardly through the associated bearings 34 and 36. The links 20 and 22 are correspondingly arranged, and are provided with corresponding pivotal connections to the frame and to the axle housing 12, respectively.

The individual spring joints are preferably constructed generally as described in the above identified co-pending application. The details of the spring joint 34 associated with the arm 18 are shown in Fig. 4, and it is to be understood that the corresponding joint associated with the link 22 is similarly constructed.

Referring to Fig. 4, the outwardly turned trunnion portion 18a of the link 18 is received in a tubular member 40. A sleeve 41 formed of rubber or equivalent resilient material is permanently bonded to the outer surface of the trunnion 18a and is correspondingly permanently bonded to the inner surface of the sleeve 40. The sleeve 40 is rigidly secured to the flange 14a of the vehicle frame 14 between a pair of brackets 42 and 44.

The flange 14a of the frame 14 is split to accommodate the spring joint and the ends 14b of the frame flange overlap the bracket 42. Studs 44 are passed through the frame 14a of the frame and through the brackets 42 and 44, so as to hold the parts rigidly in assembled relation.

In order to prevent rotation of the sleeve 40 within the brackets 42 and 44, except for the purpose of adjustment, the outer surface of the sleeve 40 is preferably corrugated or knurled as indicated at 48, and a portion at least of the inner surface of the bracket 44 is correspondingly knurled as indicated at 50. The spring joint 30 between the forward end of the link 16 and the frame 14 is arranged as described above with reference to the joint 34, with the exception that the upper bracket member 52 associated therewith is connected to a pad 54 which in turn is secured to the lower flange of the frame. The corresponding joint associated with the link 20 is correspondingly arranged.

The preferred construction for pivotally connecting the rear ends of the links to the axle housing 12 is most clearly shown in Fig. 5, in which the upper joint 56 is associated with the rear end of the link 22 and the lower joint 58 is associated with the rear end of the lower link 20. In the joint 56, a tubular member 60, formed of rubber or its equivalent, is interposed between the trunnion portion 22a of the link 22, and the outer metallic sleeve 62, and is permanently bonded to both. The outer sleeve 62 is clamped between a U-shaped portion 64 of a main bracket 66, and a cooperating bracket 68. The bracket 66 is common to both the upper joint 56 and the lower joint 58, and is secured to the axle housing 12 by a pair of U-bolts such as 70. As in the case of the previously described joint shown in Fig. 4, the outer surface of the sleeve 62 is knurled, and a portion of the inner surface of the bracket 68 is correspondingly knurled, so as to prevent rotation between the members. Studs 72 are provided for securing the bracket 68 to the main bracket 66.

The lower torsional joint 58 corresponds in all respects to the just described arrangement of the joint 56 and it will also be understood that the corresponding joints for the rear ends of the links 16 and 18 correspond to the just described joints 56 and 58.

The bracket assembly associated with the links 16 and 18 corresponds to the bracket assembly associated with the links 20 and 22, with the exception that the cap bracket 80, shown in Fig. 5, is replaced by a rearwardly projecting bracket 82, which forms a connection for one end of a torsion stabilizer 84. The other end of the torsion stabilizer 84 is connected to the opposite side of the vehicle frame 14 by means of a joint 86, the details of which are not shown. The brackets 80 and 82 are each provided with laterally formed flanges 88, which are engaged over by the previously mentioned U-bolts 70 which therefore serve to hold these brackets in assembled relation to the axle housing.

Figure 2:
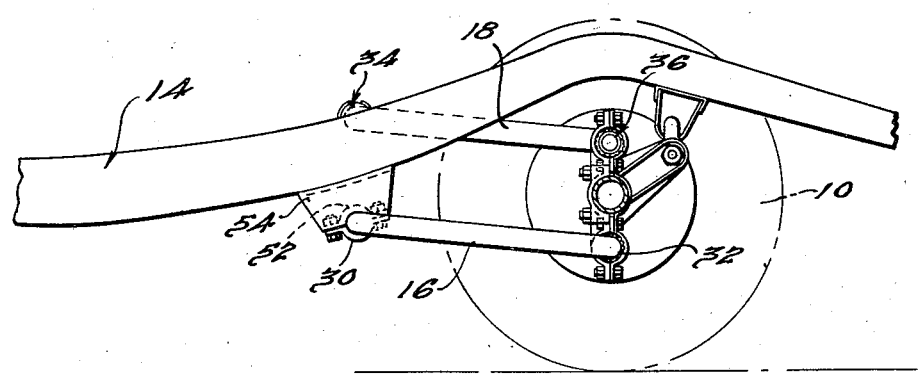
Fig. 2 is a view in side elevation, taken along the line 2—2 of Fig. 1.

It will be appreciated from the foregoing description, that the manufacture of the individual torsional joints and the link mechanism is a relatively simple matter. The adjusting and assembly of the parts is correspondingly simple. Referring particularly to Fig. 2, the assembly of the rear suspension of the present invention may be accomplished as follows. Prior to insertion of the trunnion portions of the several links 16, 18, 20 and 22 in their respective torsional joints, the frame 14 may be suitably raised to a point somewhat above its normal position above the axle housing 14. With the axle housing and the frame thus separated, the rod 18, for example, may be aligned with the opening of its associated torsional joint, and the trunnion portions thereof with the associated outer sleeves and the rubber blocks, may then be slipped between the associated retaining brackets 42 and 44 and 64 and 66. With the parts thus assembled, the studs 46 and 72 may be tightened down so as to securely hold the outer sleeves 40 and 62 against rotation relative to the frame. The remaining links may be correspondingly assembled with their cooperating torsional frame and axle brackets.

After all of the links are fitted in place, the lifting means for the frame may be removed and permitting the frame to settle under its own weight. Any downward or upward movement of the frame 14 relative to the axle housing 12, causes a rotation of the links 16, 18 and 20, 22 relative to the frame and relative to the axle housing. By virtue of the permanent bond between each link and its rubber sleeves and the corresponding permanent bond between each rubber sleeve and its outer sleeve, it will be appreciated that the just mentioned rotation causes a torsional stressing of all of the rubber sleeves. These torsional stresses in the rubber sleeves subject the frame 14 to a lifting force relative to the axle housing 12, so that the several spring joints resiliently and yieldingly support the frame 14 above the axle housing 12.

It will be understood that the normal stress in the rubber sleeve depends upon the extent to which the frame 14 is elevated relative to the axle housing 12 in the course of the assembly of the parts. If only a light initial stress is desired, the frame 14 may be elevated a correspondingly small amount above its normal position above the axle 14. If a high initial stress is desired, a corresponding greater initial elevation may be given the frame 14.

The joints may be characterized as being formed of rubber or its equivalent having characteristics such that in an intermediate or normally stressed condition, they exert sufficient upward force on the vehicle frame to effectively support it above the axles, and, at the same time, are capable of withstanding further stressing so as to permit normal springing movement of the vehicle.

It will further be noted that one member of each pair of links is disposed adjacent the outer side of the frame and that the other member of each pair is disposed adjacent the inner side of the frame. This relation is advantageous, in that it permits the links of each pair to be independently assembled and, if desired, it permits one link of each pair to be rotated about one of its pivot points without interfering with the other link of the pair.

In the modified form shown in Fig. 6, the previously described resilient sleeve 41 is replaced by a composite resilient sleeve designated as a whole as 120. The sleeve 120 is formed of an inner rubber or equivalent member 122, an outer corresponding member 124, and an intermediate strengthening member 126. The inner member 122 is bonded to the trunnion portion of the associated link 18, for example, and the outer member is bonded to the outer sleeve 40, in the previously described manner. In addition, the inner and outer members 122 and 124 are bonded respectively to the inner and outer surfaces of the intermediate strengthening member 126.

The provision of the intermediate strengthening member is found in practice to improve the stability of the joint as a whole. As one explanation for this increased stability, it is noted that the torque required to produce a certain angular movement of the joint is inversely proportional to the thickness of the intermediate resilient sleeve structure. To produce a relatively free or soft springing action, accordingly, it is desirable to provide a relatively thick resilient sleeve section. At the same time, increases in the thickness of the resilient sleeve tend to permit increased radial or other bodily movements of the trunnion portion of the associated arm within the outer member such as 40. The intermediate strengthening sleeve serves the purpose of substantially reducing these bodily movements, while at the same time permitting substantial angular movements, thus resulting in a spring joint of exceedingly desirable characteristics.

It will be noted that the use of upper and lower links, arranged in pairs, on each side of the vehicle frame, permits a relatively wide choice in the actual movement of the axle housing 12 relative to the frame 14 which accompanies springing movements of the vehicle. If a truly parallel link system is utilized, it will be appreciated that the movement of the axle housing 12 relative to the frame becomes rectilinear, and does not involve any rotative movement of the axle housing 12 about its own axis relative to the frame 14. On the other hand, by suitably adjusting the relative link of the links of each pair, the axle housing 12 may be caused to move in an arcuate path relative to the frame 14, and may also be caused to rotate to a desired extent about its own axis during such movement. The latter feature is of very substantial importance in view of the fact that it permits a more efficient operation of the usual universal joints associated with the drive shaft of the vehicle.

Fig. 7 diagrammatically shows the drive mechanism for the rear wheels of a vehicle and is illustrative of the just mentioned advantage. In Fig. 6 the usual vehicle transmission is designated 100, and is connected to the rear axle differential 102 through a suitable drive shaft 104 and stub shafts 106 and 108 which project from the transmission and differential respectively. Universal joints 110 and 112 are interposed between the drive shaft 104 and the two stub shafts.

A pair of links 16' and 18', which correspond to the two pairs of links 16 and 18 and 20 and 22, are illustrated as being pivotally connected to the vehicle frame 14 at the forward ends and as being pivotally connected at their rear ends to the two arms of a bracket 116. The bracket 116 may correspond, accordingly, to the rear axle brackets described in the foregoing parts of the specification.

It will be appreciated that the transmission is substantially directly connected to the frame and since the forward ends of the links 16' and 18' are connected to the frame, springing movements of the rear axle of the vehicle relative to the frame cause the rear end of the drive shaft 104 to move upwardly and downwardly relative to the front end thereof. These swinging movements of the drive shaft are, of course, divided between the two universal joints 110 and 112.

If the two universal joints 110 and 112 occupy corresponding rotative positions relative to the axis of rotation of the drive shaft 104, any non-uniformity introduced into the rotation of the drive shaft 104 due to the angularity of the universal joint 110 may be compensated for by causing the universal joint 112 to have a corresponding angularity. In such event, the rotation of the stub shaft 108 always corresponds to and uniformly duplicates the rotation of the stub shaft 106. Stated in another way, if the universal joints 110 and 112 are properly positioned relative to each other, and if the system is so arranged that the angle between the stub shaft 106 and the drive shaft 104 always equals the angle between the drive shaft 104 and the stub shaft 108, uniform rotation of the stub shaft 106 is accompanied by uniform rotation of the stub shaft 108.

The present invention contemplates the above described arrangement of parts and in addition contemplates imparting to the rear axle housing such a movement, in response to springing movements of the vehicle, that the actual angularity of both universal joints 110 and 112 is maintained at a minimum. This is accomplished in the illustrated arrangement by replacing the previously mentioned parallel link relation of the two links 16' and 18' by a non-parallel relation such as is shown in Fig. 6. In the figure it will be noted that the forward end of the link 16' is positioned somewhat above the position of the rear end thereof, and that such forward end is also positioned in advance of the forward end of the link 18'. With this relation it will be appreciated that springing movements of the vehicle cause the differential 102 to move in an arcuate, as distinguished from a rectilinear, path. The just mentioned disposition of the links 16' and 18' also causes the differential 102 to rotate to some extent about its own axis during the just stated arcuate movement. For example, in the full line or normal position of the parts in Fig. 6 the stub shaft 108 projects substantially horizontally from the differential 102. In the upper position shown in dotted lines, however, such as is caused by a downward movement of the frame, for example, the forward end of the sub shaft 108 is lower than the rear end thereof. In the opposite dotted line position, such for example as results from a downward movement of the wheels relative to the frame, the stub shaft 108 tilts upwardly from its rear end to its forward end. It will be seen, accordingly, that the forward end of the stub shaft 108 moves in a direction such as to reduce the angularity in the two universal joints 110 and 112. At the same time, the lengths of the two links 16' and 18' as well as the angle between them is so determined that at all times the angles between the drive shaft and the two stub shafts are equal.

Although only several specific embodiments of the invention have been described in detail, it will be appreciated that various changes in the form, number and arrangement of the parts may be made within the spirit and scope of the invention.

What is claimed is:

1. The combination with a motor vehicle frame and an axle structure extending transversely of the frame member of means forming a spring suspension between the said frame and axle structure comprising a pair of links arranged at each side of the vehicle and extending generally parallel to the longitudinal axis of the frame, a pivotal connection between one end of each arm and the frame and between the other end of each arm and the axle structure, certain of said pivotal connections comprising a tubular member on the frame, a shaft portion on the corresponding arm, and projecting into the tubular member in radially spaced relation thereto, a rubber sleeve between the tubular member and the shaft portion and bonded to both thereof, tubular means on the frame member and receiving the tubular member, and including a releasable section, means on the tubular means and on the tubular member for allowing circumferential adjustment therebetween when one section of the tubular means is released and for holding it in adjusted positions with the said section in normal position, said rubber being normally under torsional stress when the frame is supported by the wheel and providing a spring between the frame and the axle member.

2. The combination with a motor vehicle frame and an axle structure extending transversely of the frame member of means forming a spring suspension between the said frame and axle structure comprising a pair of links arranged at each side of the vehicle and extending generally parallel to the longitudinal axis of the frame, a pivotal connection between one end of each arm and the frame and between the other end of each arm and the axle structure, certain of said pivotal connections comprising a tubular member on the frame, a shaft member on the arm and projecting into the tubular member in radially spaced relation thereto, a rubber sleeve between the tubular member and shaft member and bonded to both members, tubular means on the frame and receiving the tubular member and including a releasable section, and co-acting ridges and grooves on the member and section normally holding the member against turning in the tubular means but allowing turning thereof when the section is released and also allowing application of the section to hold the member in its new position of adjustment, said rubber being normally under torsion when the frame is supported by the wheel and providing a spring between the frame and arm.

3. The combination with a motor vehicle frame and an axle structure extending transversely of the frame member of means forming a spring suspension between the said frame and axle structure comprising a pair of links arranged at each side of the vehicle and extending generally parallel to the longitudinal axis of the frame, a pivotal connection between one end of each arm and the frame and between the other end of each arm and the axle structure, certain of said pivotal connections comprising a tubular member on the frame, a shaft member on the arm and projecting into the tubular member in radially spaced relation thereto, a rubber sleeve between the tubular member and shaft member and bonded to both members, tubular means on the frame and comprising a depression in a portion of the frame and a section releasably fastened to the frame and jointly with the depressed portion providing a bore for receiving the tubular member, means including projections and recesses on the tubular member and releasable section for normally holding the tubular member against turning but permitting turning thereof when the section is released and allowing application of the section to hold the member in its new position of adjustment, said rubber normally being under torsion when the frame is supported by the wheel and providing a spring between the frame and arm.

4. The combination with a motor vehicle frame and an axle structure extending transversely of the frame member of means forming a spring suspension between the said frame and axle structure comprising a pair of links arranged at each side of the vehicle and extending generally parallel to the longitudinal axis of the frame, a pivotal connection between one end of each arm and the frame and between the other end of each arm and the axle structure, the pivotal connection between the wheel mounting member and one of the arms comprising a trunnion portion on the arm, rubber around the trunnion and bonded thereto, a metal sleeve around the rubber and bonded thereto and having axial corrugations on its outer periphery, a recessed portion on the end of the mounting and receiving the metal sleeve, a recessed plate releasably fastened to the wheel mounting member and jointly with the recessed portion of the wheel mounting member providing a recess for the metal sleeve, and corrugations on the plate and engaging certain of the corrugations on the metal sleeve.

5. In an oscillatory joint, a torsional connection comprising a pair of members adapted to have relative oscillatory movement, one having an opening and the other having a shaft portion projecting thereinto in radially spaced relation, a rubber sleeve between the shaft portion and wall of the opening and locked thereto, tubular means embracing the first member and adapted to connect it to a support and including a releasable section; means on the releasable section and on the first member for normally locking the means and member against relative turning but allowing circumferential adjustment when the section is released.

6. In an oscillatory joint, a torsional connection comprising a pair of members adapted to have relative oscillatory movement, one having an opening and the other having a shaft portion projecting thereinto in radially spaced relation, a spring element between the shaft portion and the wall of the opening and locked thereto, said spring element comprising inner and outer rubber elements having a sleeve-like reinforcing member imbedded therein, tubular means embracing the first member and adapted to connect it to a support and including a releasable section, means on the releasable section and on the first member for normally locking the means and member against relative turning but allowing circumferential adjustment when the section is released.

7. In an oscillatory joint, a torsional connection comprising a pair of members adapted to have relative oscillatory movement, one having an opening and the other having a shaft portion projecting thereinto in radially spaced relation, a torsion member interposed between the shaft portion and the wall of the opening and locked thereto, said torsion member comprising concentrically disposed rubber sleeves having a reinforcing sleeve interposed therebetween and bonded thereto, the inner said rubber sleeve being bonded to said shaft portion and the outer said sleeve being bonded to the wall of said opening, tubular means embracing the first member and adapted to connect it to a support and including a releasable section, means on the releasable section and on the first member for normally locking the means and member against relative turning but allowing circumferential adjustment when the section is released.

JOHN W. LEIGHTON.